(12) United States Patent
Inoguchi et al.

(10) Patent No.: US 8,744,735 B2
(45) Date of Patent: Jun. 3, 2014

(54) TRAFFIC INFORMATION GENERATING METHOD, TRAFFIC INFORMATION GENERATING APPARATUS, DISPLAY, NAVIGATION SYSTEM, AND ELECTRONIC CONTROL UNIT

(75) Inventors: Toshio Inoguchi, Nagoya (JP); Tomoyuki Zaitsu, Tokyo (JP); Shinichi Yamada, Kariya (JP); Kazutaka Yoshikawa, Tokyo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 851 days.

(21) Appl. No.: 12/307,968

(22) PCT Filed: Jul. 10, 2007

(86) PCT No.: PCT/JP2007/063725
§ 371 (c)(1),
(2), (4) Date: Apr. 21, 2009

(87) PCT Pub. No.: WO2008/007663
PCT Pub. Date: Jan. 17, 2008

(65) Prior Publication Data
US 2009/0292456 A1  Nov. 26, 2009

(30) Foreign Application Priority Data

Jul. 10, 2006 (JP) ................................. 2006-189561

(51) Int. Cl.
*G06F 19/00* (2011.01)
*G06G 7/70* (2006.01)
*G06G 7/76* (2006.01)
*G08G 1/00* (2006.01)

(52) U.S. Cl.
USPC ............ 701/118; 701/117; 701/119; 340/934

(58) Field of Classification Search
USPC ............. 701/117–119; 340/995.13, 933–943, 340/988–996
See application file for complete search history.

(56) References Cited

U.S. PATENT DOCUMENTS

| 5,283,573 | A | * | 2/1994 | Takatou et al. ................ 340/937 |
| 6,650,948 | B1 | * | 11/2003 | Atkinson et al. ................. 700/66 |
| 6,865,475 | B2 | | 3/2005 | Willenbrock |
| 7,366,606 | B2 | | 4/2008 | Uyeki |

(Continued)

FOREIGN PATENT DOCUMENTS

| JP | 10-021488 A | 1/1998 |
| JP | 2002-090165 A | 3/2002 |

(Continued)

OTHER PUBLICATIONS

Notice of Allowance to related U.S. Appl. No. 12/450,657, issued Dec. 31, 2012.

*Primary Examiner* — Jeffrey Shapiro
(74) *Attorney, Agent, or Firm* — Gifford, Krass, Sprinkle, Anderson & Citkowski, P.C.

(57) ABSTRACT

An embodiment provides a traffic information generating method for generating traffic information about a road on which a vehicle travels. A vehicle speed is detected by a vehicle speed sensor at predetermined distance or time intervals. By referring to a prescribed speed, a prescribed distance, and a link determination distance, a congestion degree associated with the vehicle speed is detected.

18 Claims, 13 Drawing Sheets

(56) References Cited

U.S. PATENT DOCUMENTS

| | | |
|---|---|---|
| 7,576,661 B2 | 8/2009 | Mochizuki |
| 8,005,609 B2 | 8/2011 | Uyeki et al. |
| 2005/0093720 A1* | 5/2005 | Yamane et al. .......... 340/995.13 |

FOREIGN PATENT DOCUMENTS

| | | |
|---|---|---|
| JP | 2002-092782 A | 3/2002 |
| JP | 2002342893 | 11/2002 |
| JP | 2003148973 | 5/2003 |
| JP | 2003-281674 A | 10/2003 |
| JP | 2004-504680 A | 2/2004 |
| JP | 2005-259116 A | 9/2005 |
| JP | 2005-301643 A | 10/2005 |
| JP | 2005285108 | 10/2005 |
| JP | 2005316739 | 11/2005 |
| JP | 2006059058 | 3/2006 |
| JP | 2006079504 | 3/2006 |
| JP | 2006146695 | 6/2006 |

* cited by examiner

FIG.3
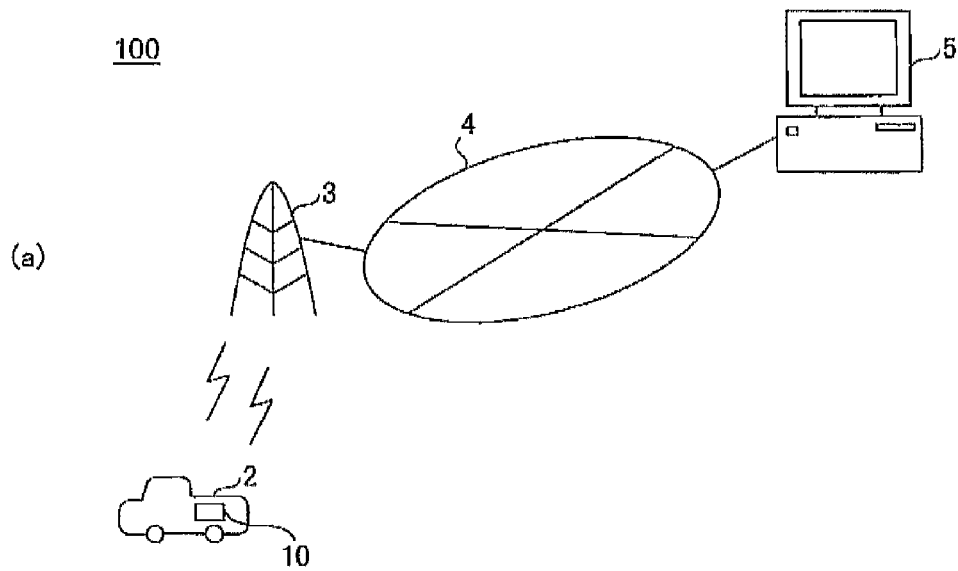
(a)
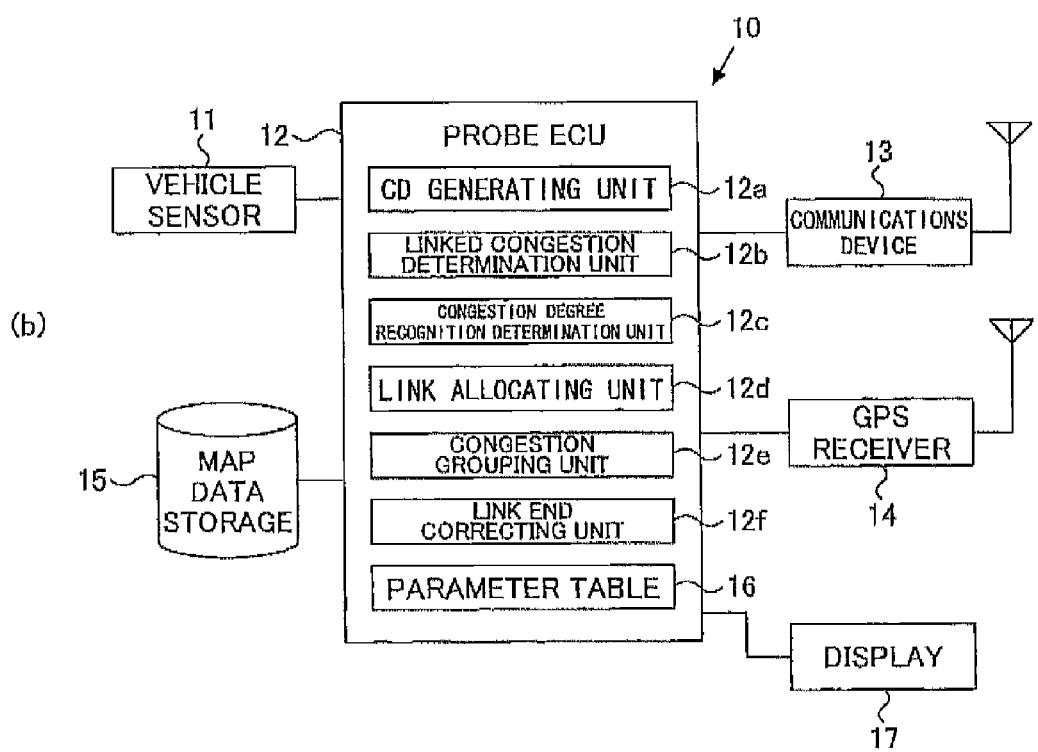
(b)

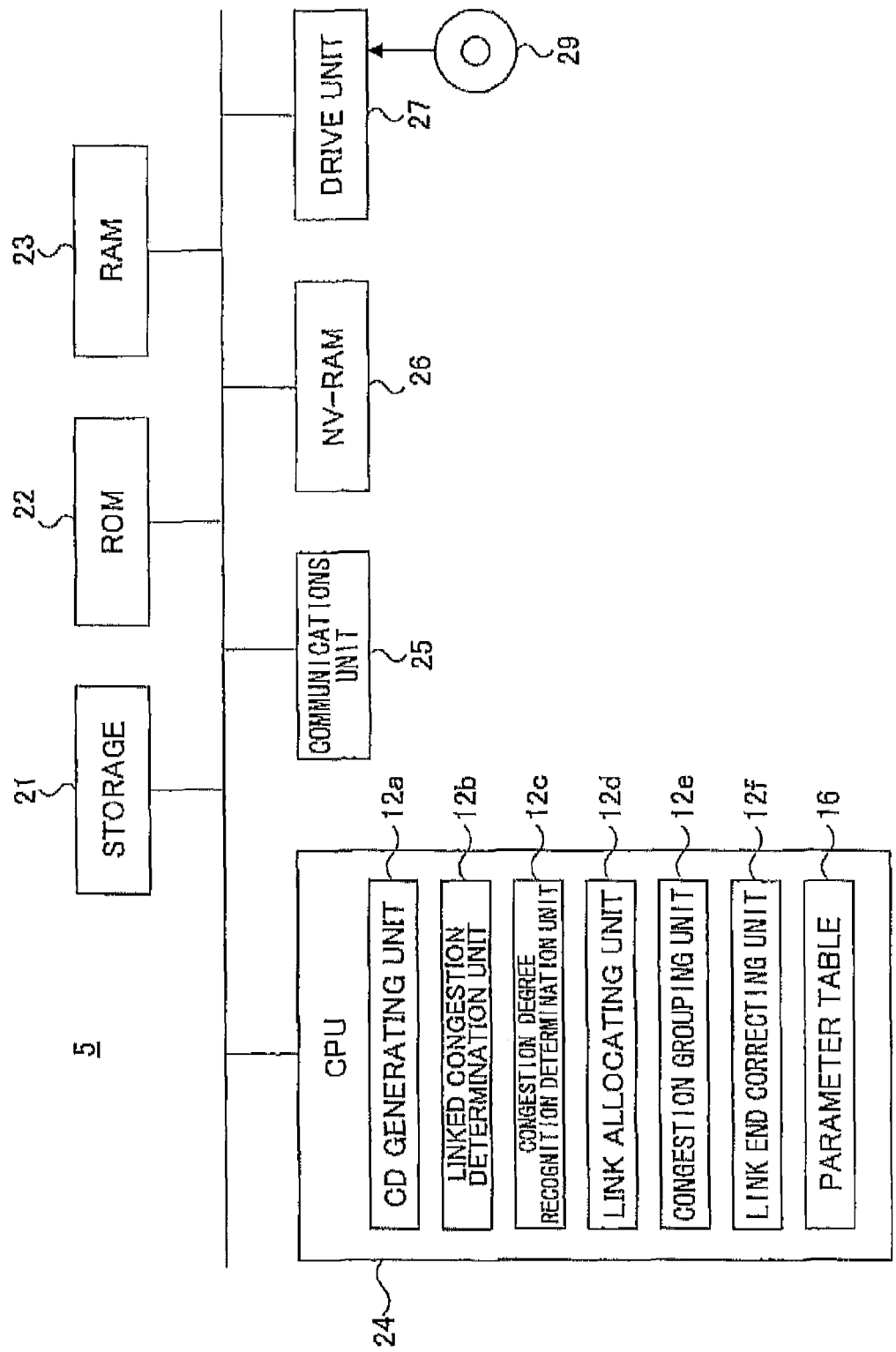

FIG.5

| ROAD TYPE | CONGESTION DEGREE | | SET VEHICLE SPEED (km/h) (Step1) | LINKED CONGESTION DETERMINATION DISTANCE (m) (Step2) | CD RECOGNITION DETERMINATION VALUE (m) (Step3) | PARTIAL CONGESTION LINK LENGTH (m) (Step4) | LINK END CORRECTION RANGE (m) (Step5) |
|---|---|---|---|---|---|---|---|
| EXPRESSWAY | VI | ABSOLUTELY NO CONGESTION | — | — | — | — | |
| | V | NO CONGESTION | H | L8 | L8 | L5 | |
| | IV | LIGHT CONGESTION | F | L5 | — | — | |
| | III | INTERMEDIATE CONGESTION | E | L5 | L5 | L5 | |
| | II | HEAVY CONGESTION | J | L4 | L5 | L5 | |
| | I | EXTREME CONGESTION | D | L2 | L3 | L5 | |
| TOLLWAY | VI | ABSOLUTELY NO CONGESTION | — | L5 | L7 | L5 | |
| | V | NO CONGESTION | G | — | — | — | |
| | IV | LIGHT CONGESTION | J | L4 | L5 | L5 | |
| | III | INTERMEDIATE CONGESTION | I | L3 | L5 | L5 | |
| | II | HEAVY CONGESTION | D | L2 | L3 | L5 | |
| | I | EXTREME CONGESTION | B | L2 | L3 | L5 | |
| GENERAL ROAD | VI | ABSOLUTELY NO CONGESTION | — | L5 | L6 | L5 | L9 |
| | V | NO CONGESTION | E | — | — | — | — |
| | IV | LIGHT CONGESTION | D | L2 | L3 | L5 | L1 |
| | III | INTERMEDIATE CONGESTION | C | L2 | L3 | L5 | L1 |
| | II | HEAVY CONGESTION | B | L2 | L3 | L5 | L1 |
| | I | EXTREME CONGESTION | A | L2 | L3 | L5 | L1 |
| IC DRIVEWAY, SA/PA DRIVE WAY | VI | ABSOLUTELY NO CONGESTION | — | L5 | L6 | L5 | |
| | V | NO CONGESTION | E | — | — | — | |
| | IV | LIGHT CONGESTION | D | L2 | L3 | L5 | |
| | III | INTERMEDIATE CONGESTION | C | L2 | L3 | L5 | |
| | II | HEAVY CONGESTION | B | L2 | L3 | L5 | |
| | I | EXTREME CONGESTION | A | L2 | L3 | L5 | |

16

FIG.9
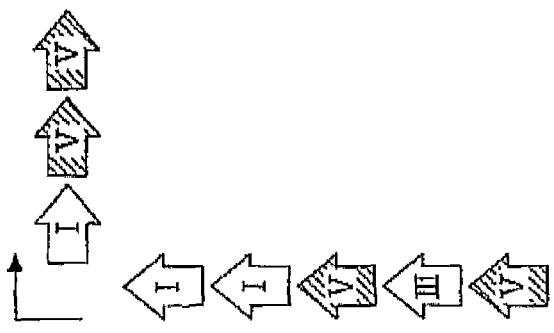
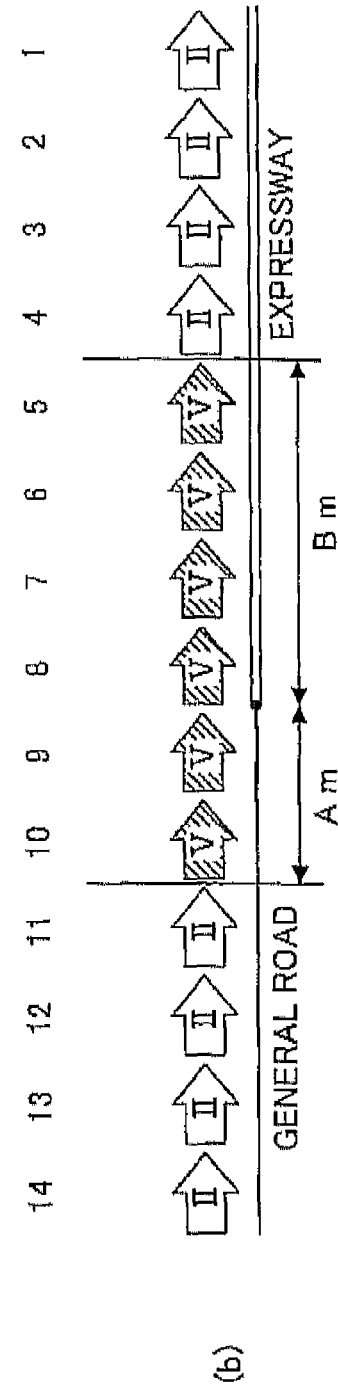
(a)
(b)

FIG.11
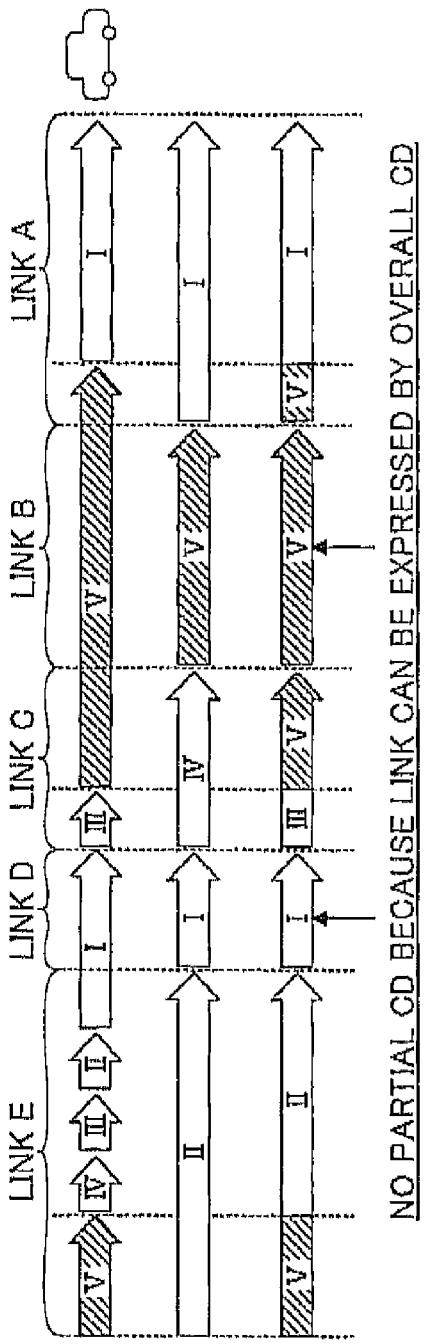
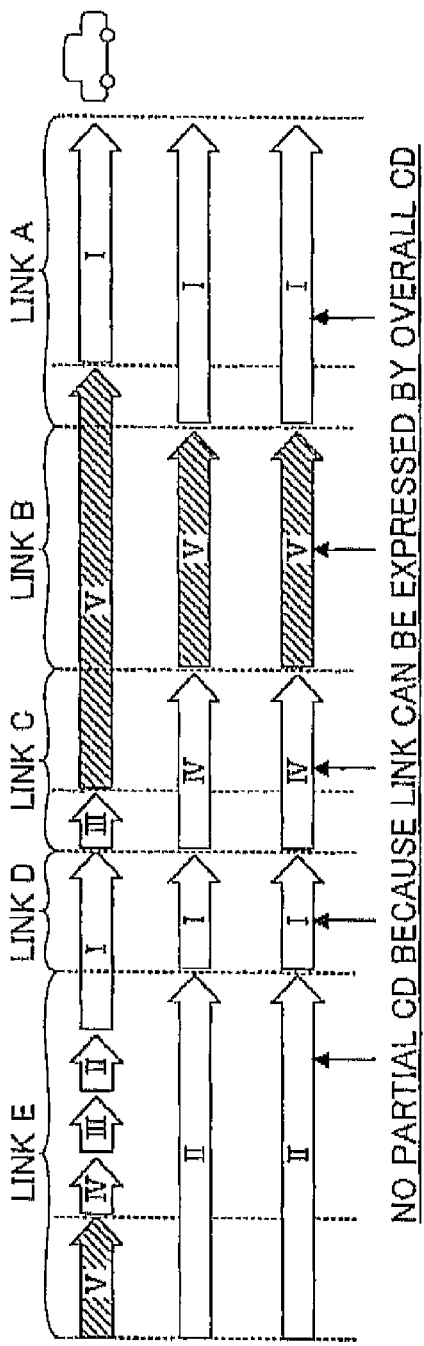

FIG.12
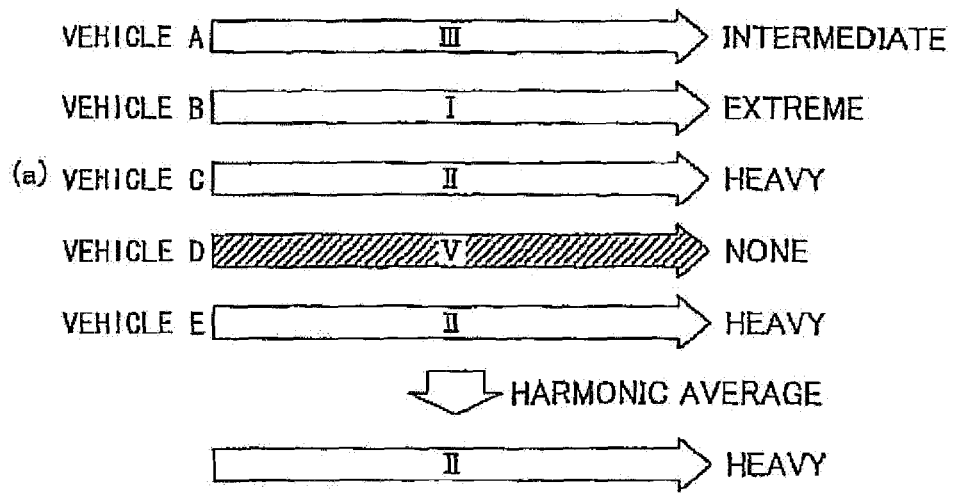
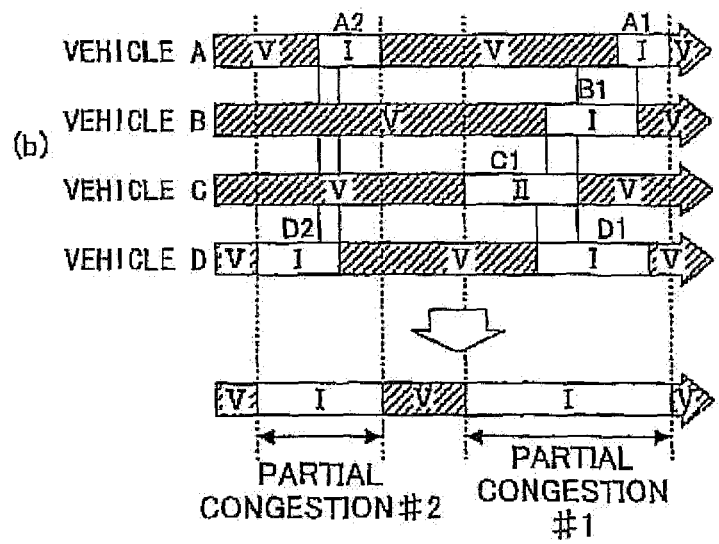
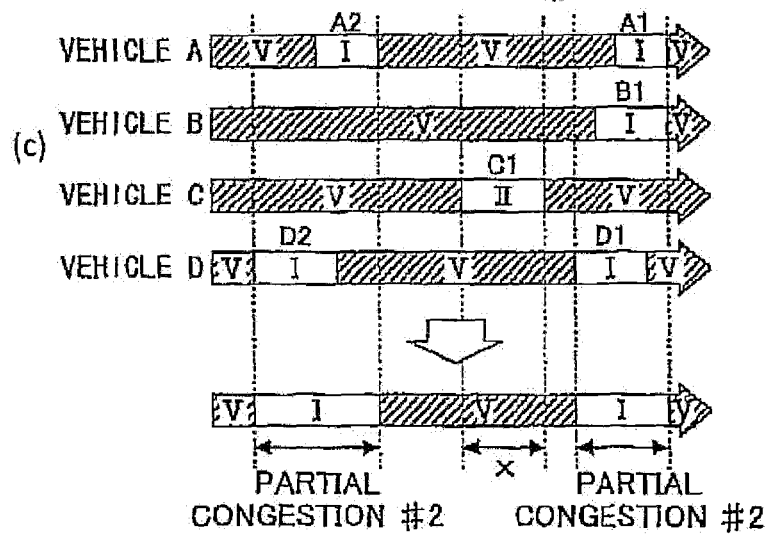

FIG.13
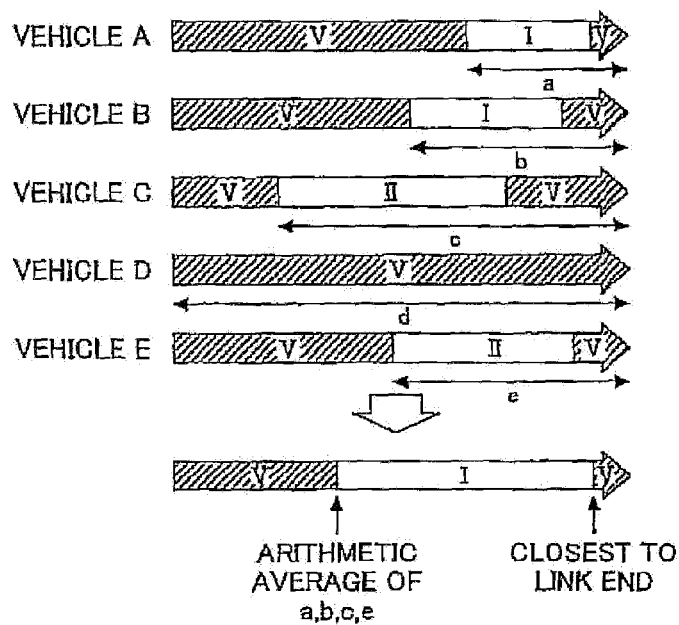
(b) BEFORE CORRECTION
AFTER CORRECTION
BEFORE CORRECTION
AFTER CORRECTION
(c) BEFORE CORRECTION
AFTER CORRECTION
BEFORE CORRECTION
AFTER CORRECTION

TRAFFIC INFORMATION GENERATING METHOD, TRAFFIC INFORMATION GENERATING APPARATUS, DISPLAY, NAVIGATION SYSTEM, AND ELECTRONIC CONTROL UNIT

CROSS-REFERENCE TO RELATED APPLICATIONS

This application is a 35 U.S.C. §371 application of PCT/JP2007/063725 filed on Jul. 10, 2007, which claims priority to Japanese Priority Application No. 2006-189561 filed on Jul. 10, 2006, both of which are hereby incorporated by reference.

TECHNICAL FIELD

The present invention relates to traffic information generating methods and traffic information generating apparatuses for generating traffic information about a congestion and the like by tallying information about vehicle speed and the like from plural probe cars that actually travel on a road, in the probe cars or a server. The invention also relates to displays, navigation systems, and electronic control units for such purpose.

BACKGROUND ART

Vehicle information communication systems (VICS) and probe car information systems are known in which information about vehicle speeds, time and the like is gathered and traffic information is generated. In a probe car information system, information about speeds at which a vehicle has actually run on a road and its position is collected to generate traffic information indicating congestions or the like (see Japanese Laid-Open Patent Application No. 2003-281674, for example; hereafter referred to as Patent Document 1).

In the probe car information system discussed in Patent Document 1, an average speed and chronological changes in the position of a vehicle is calculated based on vehicle information relating to the position of the vehicle and the corresponding time, thereby generating congestion information. Further, the vehicle information is divided at predetermined time intervals into transport groups that are partially overlapped. When the average speed in a particular transport group is within a predetermined speed range, the length of the transport group is calculated in terms of a congestion length or average speed.

The above publication states that in this way, factors unrelated to a congestion, such as turns or lane changes made by a vehicle running ahead of a vehicle of interest, temporary vehicle stops necessitated by jaywalking pedestrians, or a temporary acceleration following such temporary stops, can be removed, so that an accurate congestion length can be determined.

However, in the probe car information system of Patent Document 1, the traffic signal waiting time is not subtracted from the transit time between predetermined points, such as intersections. As a result, the average speed is influenced by the stops required by the traffic signals, thus making it difficult to generate highly accurate congestion information.

It is a general object of the present invention to provide a traffic information generating method, a traffic information generating apparatus, a display, a navigation system, and an electronic control unit, whereby accurate traffic information can be generated by removing the influence or speed drops due to factors other than a congestion, such as the stops made at the traffic signals.

SUMMARY OF THE INVENTION

The present invention may provide a traffic information generating method for generating traffic information about a road on which a vehicle travels. The method includes a vehicle speed detecting step of detecting a vehicle speed using a vehicle speed sensor at certain distance or time intervals. The method also includes a congestion degree detecting step (such as steps S1 to S3 shown in FIG. 1). In the congestion degree detecting step, a congestion degree detection unit (such as a congestion degree generating unit 12a, a linked-congestion determination unit 12b, and congestion degree recognition determination unit 12c) detects a congestion degree associated with the vehicle speed by referring to a prescribed speed (such as a vehicle speed set in a parameter table), a prescribed distance (such as a congestion degree recognition determination value), and a link determination distance (such as a linked-congestion determination distance), which are prescribed in association with the congestion degree.

There may be provided a traffic information generating method, a traffic information generating apparatus, a display, a navigation system, and an electronic control unit whereby the influence of a speed decrease due to factors other than a congestion, such as the stops made at the traffic signal, can be removed and accurate traffic information can be generated.

BRIEF DESCRIPTION OF THE DRAWINGS

FIG. 3 shows an overall configuration of a traffic information generating system, and a functional block diagram of an on-board device;

FIG. 4 shows a hardware structure of a vehicle information server;

FIG. 5 shows a parameter table in which congestion degrees are registered on an individual road type basis;

FIG. 9 shows an example of congestion degrees detected at the time of a right turn;

FIG. 11 illustrates how a representative congestion degree and a partial congestion degree are generated by a link allocating unit;

FIG. 12 illustrates a representative congestion degree for the same link generated on the basis of plural vehicles; and FIG. 13 illustrates how a link end is corrected.

Figure 1:
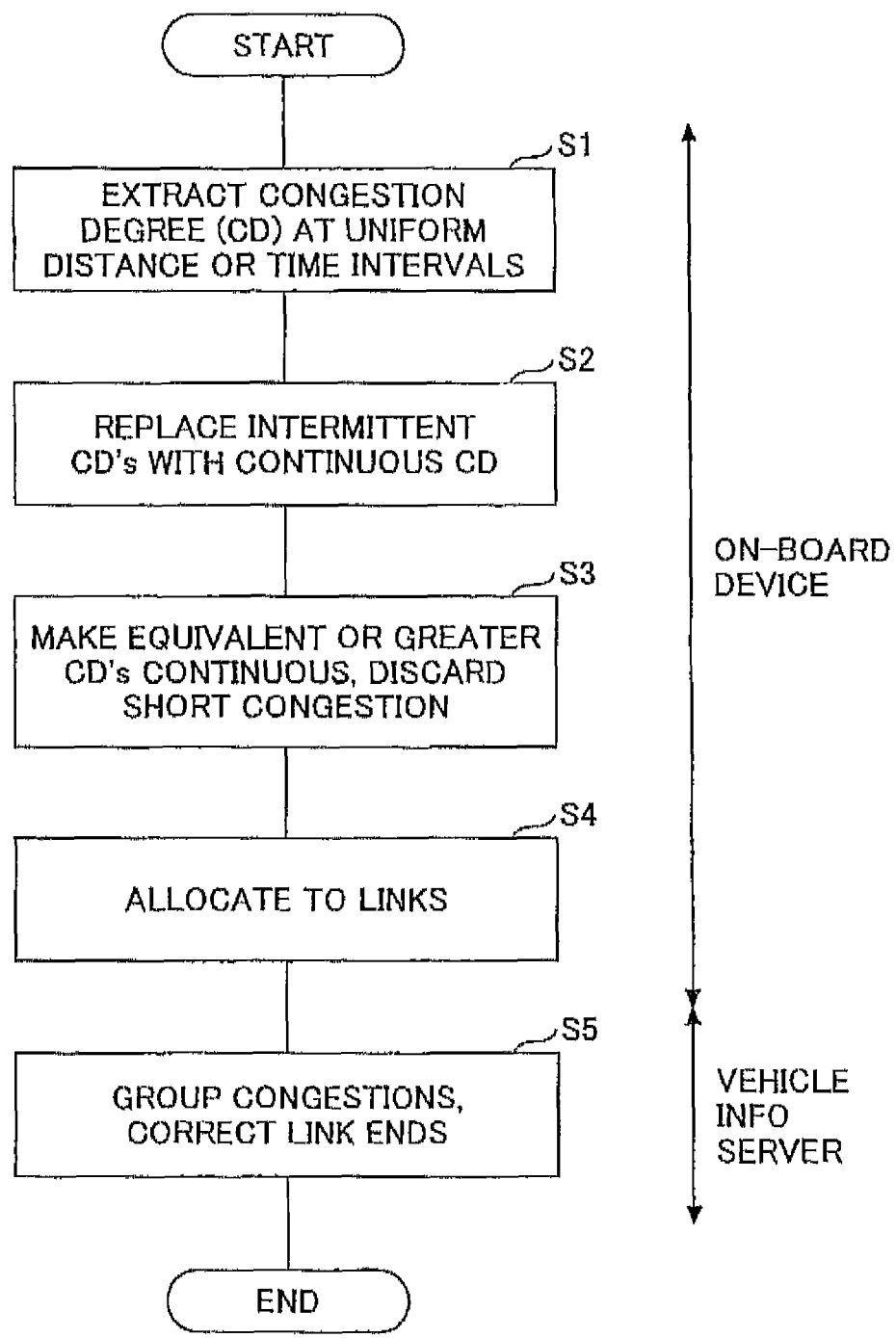
FIG. 1 shows a flowchart of a process of generating traffic information.

DESCRIPTION OF THE NUMERALS 2 vehicle
3 base station 4 network
5 vehicle information server
10 on-board device
11 vehicle speed sensor
12 probe ECU
12a congestion degree generating unit
12b linked-congestion determination unit
12c congestion degree recognition determination unit
12d link allocating unit
12e congestion location grouping unit
12f link end correcting unit
13 communications unit
14 GPS receiver
15 map data storing unit
16 parameter table
17 display
100 traffic information generating system

DETAILED DESCRIPTION OF THE INVENTION

Hereafter, preferred embodiments of the present invention are described with reference to the drawings. First, an outline of a process for generating congestion degree information is described.

Figure 2:
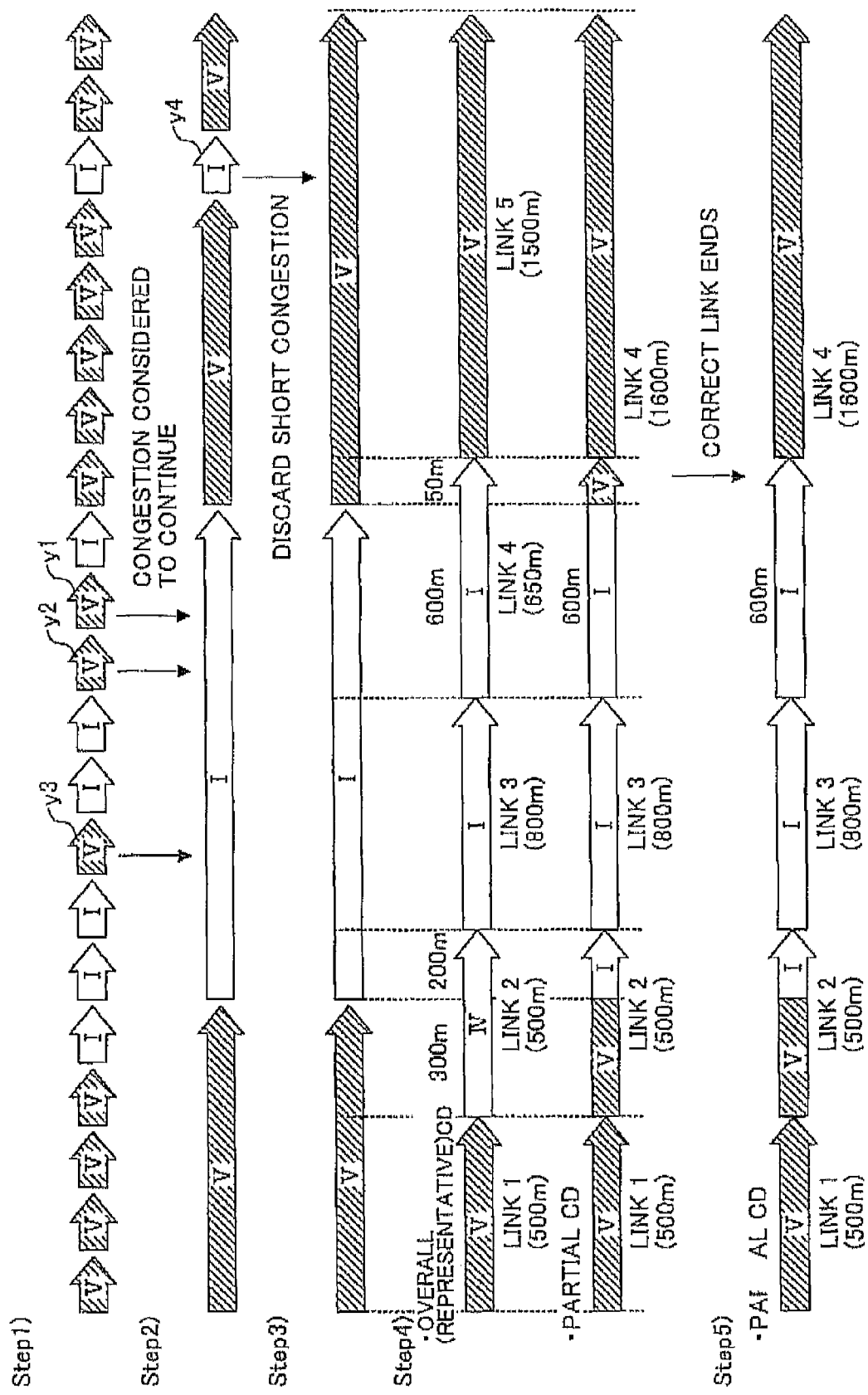
FIG. 2 illustrates the process of generating the traffic information on a step-by-step basis.

FIG. 1 shows a flowchart of a method of generating traffic information according to an embodiment. FIG. 2 shows how traffic information is generated in a step-by-step manner. In the traffic information generating method according to the present embodiment, based on vehicle information about a road on which a so-called probe car (hereafter simply referred to as a vehicle) runs, information is generated indicating whether the road is congested, and if so, how congested the road is. The terms "vehicle information" may include a vehicle speed, a vehicle position, a congestion degree, and the like that may be detected from the vehicle. The vehicle information may also refer to information obtained by processing any of the aforementioned items of information.

The traffic information may be generated in either an on-board device 10 or a server (such as a vehicle information server 5) that can be connected to a vehicle 2, as shown in FIG. 3, as long as the vehicle information and the vehicle position information can be acquired. However, at the stage where the vehicle information about a particular vehicle alone is processed, preferably the on-board device 10 generates the vehicle information because in this way a communication process can be omitted. On the other hand, in a case where more detailed traffic information is to be generated from vehicle information obtained from plural vehicles, preferably the server generates the traffic information. Thus, in the present embodiment, steps S1 to S4 are processed by the on-board device 10, while step S5 is mainly processed by the vehicle information server 5.

In step 1, congestion degrees are acquired at certain intervals of distance or time. In the present embodiment, six congestion degrees ("CD") are considered. CD I indicates there is an extreme congestion. CD II indicates there is a heavy congestion. CD III indicates there is an intermediate congestion. CD IV indicates there is a light congestion. CD V indicates there is no congestion. And CD VI indicates there is absolutely no congestion. When the road condition belongs to none of the aforementioned degrees, the congestion degree is considered unclear.

In the present embodiment, CD's I to IV may be collectively referred to as a "slow-state congestion degree". On the other hand, the CD VI, at which the vehicle can travel even faster than at CD V, may be referred to as a "fast-state congestion degree". When a reference is made to a "congestion", a "congestion location", or a "congested state", it is assumed that there is a state other than CD's V and VI. When a reference is made to terms such as a "high-speed road", a "high-speed location", a "high-speed state", or the like, it is assumed that CD VI is present.

Referring to FIG. 2, in step S1, each arrow indicates a congestion degree for the fixed distance. In other words, the numbers in the arrows indicate the travelling speeds of the probe car. Such congestion degree information is acquired by the on-board device 10 at certain intervals of distance (or time).

In step S2, intermittent congestions are replaced with (or linked into) a linked congestion. For example, the arrows y1, y2, and y3 with CD V (no congestion) are located between the arrows with CD I (extreme congestion). Although there is no congestion in the individual sections of the arrows y1, y2, and y3, a congestion reappears within a certain distance or time. Thus, the no-congestion arrows y1, y2, and y3 are disregarded.

In step S3, equal (or higher) congestion degrees are regarded as being continuous, and a congestion with a distance less than a predetermined distance is discarded. For example, the arrow y4 with CD I (extreme congestion) is located between the arrows with CD V (no congestion). When such a short interval of congestion appears in a section with no congestion, that section is regarded as a continuation of no congestion. When equal congestion degrees continue in a section, the section is regarded as a continuation of the same congestion degree.

In step S4, links (which are roads connecting intersections) are allocated individual congestion degrees. In steps S1 to S3, the congestion degree is not associated with the link because the location where a congestion may occur is not dependent on the breaks in the links. Thus, the congestion degrees generated by the processes up to step S3 are allocated to the individual links in step S4

When allocating the congestion degrees to the links, an overall congestion degree and a partial congestion degree are created. The overall congestion degree indicates the overall degree of congestion of a particular link as a whole. The partial congestion degree indicates detailed congestion degrees within a link. For example, in the example of FIG. 2, there are five links delimited by dotted lines. Such link information may be obtained from a map data storing unit 15 of a car navigation system shown in FIG. 3B. By allocating the congestion information to the individual links, the degree of congestion of an individual link as a whole and the more detailed congestion degree information within the link can be detected.

In step S5, the congestion degree at the link end is corrected. In the traffic information generating system 100 shown in FIG. 3A, the vehicle may stop at or start from the signal, whereby the vehicle speed may drop at the beginning or end of a link. As a result, the congestion degree at the link end may not be accurately detected. Thus, such inaccuracies are corrected in step S5. The process of step S5 is performed by the vehicle information server 5 that is connected via a network 4, as will be described later.

Thus, actual vehicle speeds, rather than an average speed, are acquired in step S1. Then in step S2, a short distance of no congestion is disregarded. A short congestion distance after linking congestions may be discarded in step S3 so that temporary vehicle speed variations can be removed.

Thus, in the traffic information generating method of the present embodiment, a continuation of low (or high) vehicle speeds in a predetermined period corresponding to the vehicle speed is extracted. Accordingly, traffic information that reflects the actual transit time can be generated.

Thus, errors in the congestion location due to different positions where individual vehicles may stop can be corrected. By detecting CD VI, a road where one can drive his or her vehicle comfortably can be detected.

FIG. 3(a) schematically shows the traffic information generating system 100 mentioned above. FIG. 3(b) shows a functional block diagram of the on-board device 10 (which corresponds to a "traffic information generating apparatus" recited in the claims) on the vehicle 2. The on-board device 10 is configured to collect vehicle information such as a vehicle speed of the vehicle 2. The vehicle 2 transmits the vehicle information to the vehicle information server 5 at a vehicle information center where the vehicle information is processed, via a base station 3 and network 4. The vehicle 2 can also receive information about a link-end-corrected congestion degree from the vehicle information server 5.

The network 4 may include the Internet. The vehicle 2 may communicate with the base station 3 either wirelessly or via wire.

The base station 3 and the vehicle information server 5 may be connected by a wired connection, such as a public switched telephone network (PSTN), a digital communications network such as the Integrated Services Digital Network (ISDN), or optical fibers. The base station 3 and the vehicle 2 may be connected wirelessly, such as by a cellular phone network; a Personal Handy-phone System (PHS) network; a wireless LAN; a Worldwide Interoperability for Microwave Access (WiMAX); a satellite telephone technology; a beacon technology; a Dedicated Short Range Communications (DSRC) system; or the like.

For data transmission and reception, a protocol that is upward-compatible with the Transmission Control Protocol (TCP)/Internet Protocol (IP) may be used, such as the Hyper Text Transfer Protocol (HTTP), the File Transfer Protocol (FTP), the Multipurpose Internet Mail Extension (MIME), and the like.

The on-board device 10 includes a global positioning system (GPS) receiver 14, a vehicle speed sensor 11, a communication unit 13, a map data storing unit 15 storing road map information, and a probe electronic control unit (ECU) 12.

The GPS receiver 14 is configured to receive a radio signal from a GPS satellite. The vehicle speed sensor 11 is configured to detect a vehicle speed of the vehicle 2 based on a vehicle speed pulse or the like. The communication device 13 is configured to transmit vehicle information to the vehicle information center 5 or receive congestion degree information from the vehicle information server 5. The ECU 12 controls the aforementioned units.

The road map information may be stored in the map data storing unit 15 at the time of shipping of the vehicle 2 or the car navigation system 100. Alternatively, the road map information may be downloaded from a predetermined server and then stored in the map data storing unit 15.

The road map information stored in the map data storing unit 15 may include road networks or intersections in association with the latitudes and longitudes. A road map may be structured as a database table in which an actual road network is associated with nodes (where roads intersect one another; i.e., intersections) and links (i.e., the roads connecting nodes). Link information may include information about the road type, such as a general road or a vehicle-only road, traffic limitations such as speed limits, facilities such as restaurants, and so on.

The probe ECU 12 may be provided by a computer including a central processing unit (CPU) for executing a program, a read-only memory (ROM) storing programs, a random access memory (RAM) for temporary storage of data or programs, an input/output unit for the input and output of data, and a bus connecting the above units.

The CPU in the probe ECU 12 may execute one or more programs to realize a congestion degree generating unit 12a, a linked-congestion determination unit 12b, a congestion degree recognition determination unit 12c, and a link allocating unit 12d. When the link end is corrected in the vehicle 2, the CPU in the probe ECU 12 may execute one or more programs to realize a congestion location grouping unit 12e and a link end correcting unit 12f. A parameter table 16 is used for setting the congestion degrees, as will be described later. The parameter table 16 may be stored in the ROM of the probe ECU 12, or it may be partially or entirely downloaded from the vehicle information server 5.

Based on the position information about the vehicle 2 that is detected by the GPS receiver 14, the probe ECU 12 extracts a road map for areas around the vehicle 2 from the map data storing unit 15. The road map is then displayed on a display 17, along with the position of the vehicle 2 and the traffic information generated by the traffic information generating method of the present embodiment. The roads displayed may be colored with various colors associated with the different degrees of congestion.

FIG. 4 shows a hardware structure of the vehicle information server 5. The vehicle information server 5 may be provided by a computer that includes a CPU 24, a ROM 22, a RAM 23, a storage unit (such as a hard disk drive (HDD)) 21, a communication unit 25, a non-volatile RAM (NVRAM) 26, a drive unit 27, and a bus 28 via which the above units are mutually connected.

The CPU 24 may execute various programs. The ROM 22 may store programs or drivers. The RAM 23 may be used for temporary storage of data or programs. The storage unit 21 may store an operating system (OS), programs, or files. The communication device 25 may include a network card for connection with the network 4. The NVRAM 26 may store parameter information. The drive unit 27 may be configured to read and write a recording medium, such as a compact disc read-only memory (CD-ROM).

In the storage unit 21 of the vehicle information server 5, programs that are executed by the CPU 24 for realizing various units are installed. The units realized by these programs include a congestion degree generating unit 12a, a linked-congestion determination unit 12b, a congestion degree recognition determination unit 12c, a link allocating unit 12d, a congestion location grouping unit 12e, and a link end correcting unit 12f. When the vehicle information server 5 generates the traffic information in steps S1 to S5, all of the programs are executed by the CPU 24. When step S5 alone is realized by the vehicle information server 5, the programs for realizing the congestion location grouping unit 12e and the link end correcting unit 12f are executed. The vehicle information server 5 may include the parameter table 16 either partially or entirely, as needed.

The programs may be distributed via a recording medium 29 or downloaded via the network 4 and installed in the storage unit 21.

In the following, a description is given of a method of generating the congestion degree information using the above structure, from step S1 to step S5 in order.

(Step S1)

The congestion degree generating unit 12a acquires vehicle speed information detected by the vehicle speed sensor 11 on a vehicle at regular intervals of distance (or time) as the vehicle travels. For example, the vehicle speed information is acquired at 10 m or 1 second intervals.

Upon acquisition of the vehicle speed in each interval, the congestion degree generating unit 12a extracts a congestion degree corresponding to the vehicle speed. FIG. 5 shows the parameter table 16, which is used for the setting of congestion degrees that are registered for each road type. The road types include expressway, tollway, general road, interchange (IC) driveway, and service area (SA)/parking area (PA) driveway. For each of those road types, a set speed, a linked-congestion determination distance, a congestion degree recognition determination value, a partial congestion link length, and a link end correction range are set and registered in association with CD's I to VI. Because the set speeds for setting the congestion degrees are varied depending on the road type, a congestion degree that agrees with the driver's senses can be extracted.

The congestion degree generating unit 12a extracts the congestion degree corresponding to the vehicle speed with reference to the parameter table 16. For example, when the vehicle is running on the general road, CD I (extreme congestion) is extracted when the vehicle speed is A km/h or lower; CD II (heavy congestion) when the vehicle speed is B km/h or lower; CD III (intermediate congestion) when the vehicle speed is C km/h or lower; CD IV (light congestion) when the vehicle speed is D km/h or lower; CD V (no congestion) when the vehicle speed is E km/h or smaller; and CD VI (absolutely no congestion) when the vehicle speed is none of the above, where the speeds are such that $A<B<C<D<E<F<G<H$.

Figure 6:
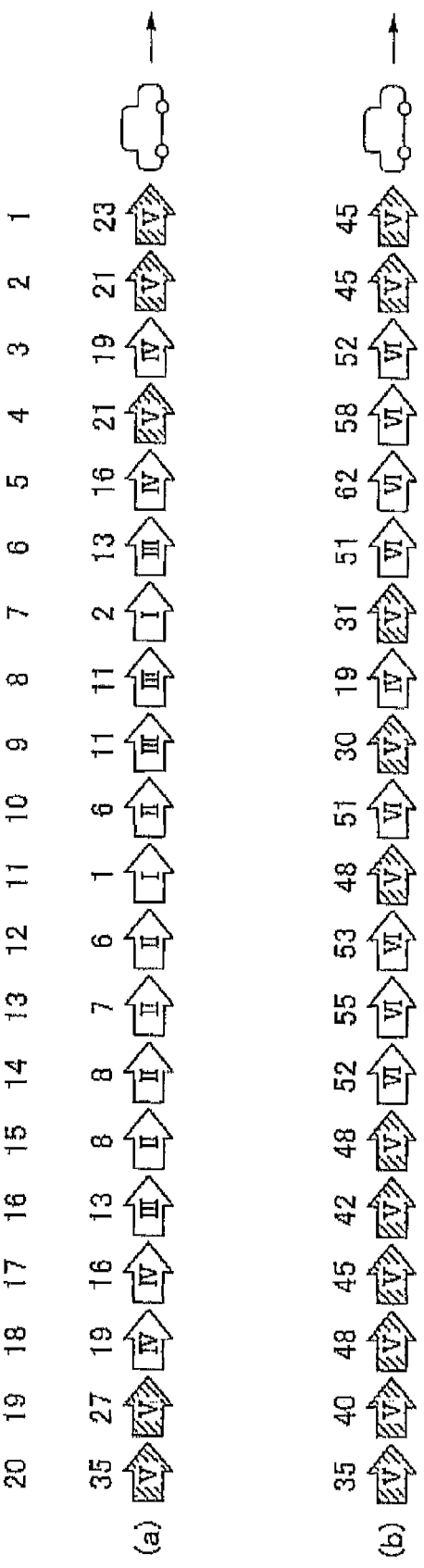
FIG. 6 shows arrows indicating congestion degrees extracted in accordance with various vehicle speeds.

FIG. 6 shows arrows indicating the congestion degrees extracted in accordance with the vehicle speeds. FIG. 6(a) shows the slow-state congestion degree. FIG. 6(b) shows the fast-state congestion degree.

The numbers above each arrow indicate the vehicle speeds, and the numbers within each arrow indicate the congestion degrees extracted in accordance with the vehicle speeds. The numbers 1 to 20 at the top indicate the order of acquisition of the vehicle speed. Such information about the vehicle speed and congestion degree may be stored in the RAM of the probe ECU 12 or in a part of the map data storing unit 15 as vehicle information.

Thus, in accordance with the present embodiment, the congestion degree is determined based on the vehicle speed at individual points, rather than an average speed. By removing the influence of the instantaneous changes in vehicle speed in steps S2 and S3, it becomes possible to generate traffic information that is not influenced by the stops made at the signals or the temporary changes in vehicle speed.

If the congestion degree is calculated based on the average speed, changes caused by instantaneous vehicle speed changes are also incorporated into the average speed, so that it becomes difficult to determine whether a decrease in the average speed is due to a congestion or the traffic signal. In accordance with the present embodiment, traffic information can be generated by distinguishing the influence of a congestion from that of the traffic signal.

(Step S2)

In step S2, based on the congestion degrees extracted by the linked-congestion determination unit 12b in step S1, intermittent congestions are replaced by a continuation of a congestion degree. The "slow-state congestion degree" refers to the four levels of congestion; i.e., CD's I (extreme congestion), II (heavy congestion), III (intermediate congestion), and IV (light congestion). In step 2, when a congestion degree equal to or higher than a particular congestion degree reappears within a predetermined distance, the in-between congestion degrees are replaced with the particular congestion degree within the predetermined distance.

The "fast-state congestion degree" refers to CD VI (absolutely no congestion). In accordance with the present embodiment, if CD VI reappears within a predetermined distance, CD VI is allocated to a relevant interval.

Such "predetermined distance" in step S2 is registered in the parameter table 16 of FIG. 5 as a "linked-congestion determination distance" for each road type in advance. For example, the case of CD IV (light congestion) for the general road is considered. Assume that CD V (no congestion) appeared after a duration of CD IV. Then, if a congestion degree equal to or greater than CD IV reappears within the linked-congestion determination distance L2 (m), the intervening duration of CD V is replaced with CD IV.

Namely, when a congestion degree lower than a particular congestion degree reappears in the linked-congestion determination distance, the lower congestion degree is replaced with the particular (i.e., higher) congestion degree.

Figure 7:
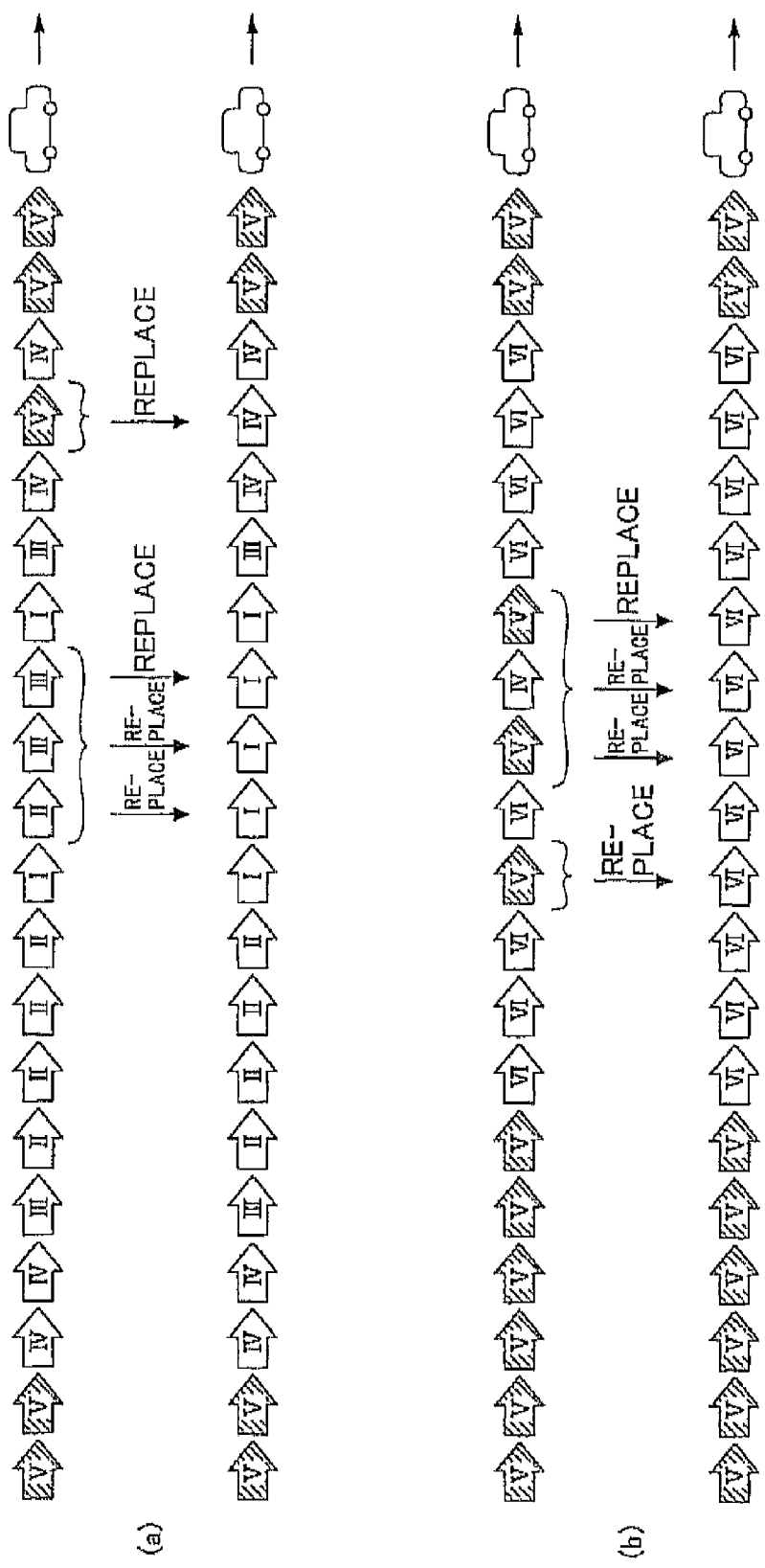
FIG. 7 illustrates how a congestion degree is replaced by a linked-congestion determination unit.

FIG. 7 illustrates how the congestion degrees are replaced by the linked-congestion determination unit 12b. FIG. 7(a) corresponds to the slow-state congestion degree shown in FIG. 6(a). FIG. 7(b) corresponds to the fast-state congestion degree shown in FIG. 6(b).

The linked-congestion determination distance L2 according to the present embodiment corresponds to a travel distance constituted by three arrows. Thus, if an equal or greater congestion degree is detected within three arrows, the preceding (temporary) congestion degree(s) are replaced with an earlier congestion degree.

In the case of FIG. 7(a), CD IV (light congestion) is detected with regard to the 3rd arrow (from the right; the number indicating the order of detection), followed by the detection of CD V (no congestion). Then in the 5th arrow, CD IV is again detected. Thus, the congestion is once eliminated only to be followed by the appearance of CD IV within the linked-congestion determination distance. Therefore, CD V of the 4th arrow is replaced by CD IV.

In the 7th arrow, CD I (extreme congestion) is detected. This is followed by CD III (intermediate congestion) in the 8th and 9th arrows, and then by CD II (heavy congestion) in the 10th arrow. In the 11th arrow, CD I is once again detected. In other words, the congestion is reduced in the intervals of the 8th to 10th arrows, but it reappears within the linked-congestion determination distance. Thus, the congestion degrees in the 8th to 10th intervals are replaced with CD I (extreme congestion).

Figure 8:
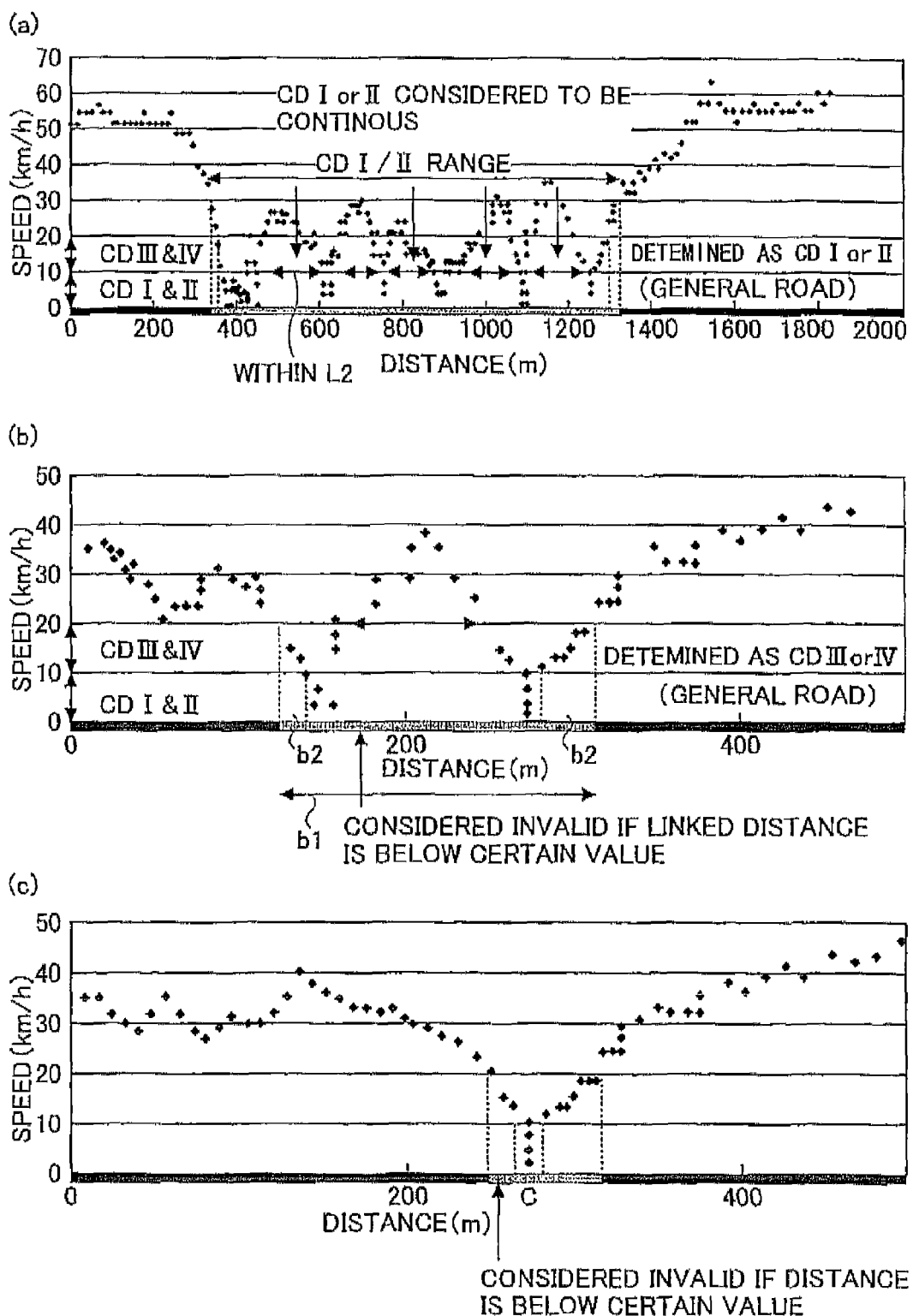
FIG. 8 shows examples of the relationship between travel distance and vehicle speed.

FIG. 8(a) shows an example of the relationship between travel distance and vehicle speed in a case where the slow-state congestion degree is detected. In FIG. 8(a), in the interval of travel distances between about 300 m and about 1300 m (hereafter referred to as a congestion range), low vehicle speeds are intermittently detected. When the intervals with vehicle speeds ranging from 0 to 10 km/h are defined as a heavily congested area, and the intervals with vehicle speeds ranging from 10 to 20 km/h are defined as a lightly congested area, the congestion degree generating unit 12a extracts either CD I, II, III, or IV from the congestion range.

Vehicle speeds associated with CD V (no congestion) are also detected in the congestion range. However, because either CD I, II, III, or IV is detected again within the linked-congestion determination distance L2, the linked-congestion determination unit 12b considers that a congestion continues in the congestion range. By thus linking intermittent congestions, repetitions of accelerations and decelerations of a vehicle in short distances can be regarded as constituting a continuous congestion.

Similarly, the fast-state congestion degree is replaced. Referring to FIG. 7(b), after CD VI (absolutely no congestion) is detected in the 6th arrow, CD V (no congestion) is detected in the 7th arrow, followed by the detection of CD IV (light congestion) in the 8th arrow and CD V (no congestion) in the 9th arrow. However, the vehicle speed in the 10th arrow is associated with CD VI (absolutely no congestion).

In other words, although the fast-state congestion degree (=absolutely no congestion) is eliminated in the intervals of the 7th and 9th arrows, CD VI (absolutely no congestion) is again detected within the linked-congestion determination distance. Thus, the congestion degrees in the 7th through 9th intervals are replaced with CD VI.

After CD VI (absolutely no congestion) is detected in association with the vehicle speed of the 10th arrow, CD V (no congestion) is indicated by the vehicle speed of the 11th arrow, and then CD VI (absolutely no congestion) is once again indicated by the vehicle speed of the 12th arrow. Namely, although the (fast-state) congestion degree is eliminated in the interval of the 11th arrow, CD VI (absolutely no congestion) is detected again within the linked-congestion determination distance. Thus, the congestion degree of the 11th arrow is replaced with CD VI (absolutely no congestion).

As mentioned above, the fast-state congestion degree (=CD VI: absolutely no congestion) refers to the state of traffic even lighter than CD V (no congestion). Thus, any congestion degree that may temporarily exist among CD VI (absolutely no congestion) presumably reflects a deceleration to avoid collision with another vehicle in front waiting to turn right, for example, and thus does not indicate the actual congestion degree appropriately. Thus, by replacing such temporary congestion degrees with CD VI, the fast-state congestion degree can be accurately detected.

While a vehicle may turn right or left, the vehicle speed of the vehicle is detected at regular intervals of distance (or time). As a result, the vehicle speed at the time of deceleration for a right or left turn is also detected. Consequently, the vehicle speed may be lowered even if there is no congestion. If congestion degrees are linked on the basis of the vehicle speeds at the time of deceleration due to a right or left turn, the congestion degrees before or after the right or left turn may be erroneously replaced. Therefore, in accordance with the present embodiment, the congestion degrees are not linked at the time of a right or left turn.

FIG. 9(a) shows an example of congestion degrees detected at the time of a right turn. As shown, the congestion degrees before and after the right turn are regarded as separate groups so that these congestion degrees are not linked by the linked-congestion determination unit 12b even if the aforementioned conditions are met.

Whether the vehicle made a right turn or a left turn is determined based on the road map in the car navigation system. When the direction of a link along which a vehicle runs is changed, the linked-congestion determination unit 12b may determine that the vehicle made a right turn or a left turn if the angle made by the links before and after the direction change is equal to or greater than a predetermined angle. Upon detection of the right turn or the left turn, the location of the right turn or the left turn is saved in the vehicle information.

Because the linked-congestion determination distance is registered for each road type, which linked-congestion determination distance should be applied when a vehicle travels across roads with different road types must be considered.

FIG. 9(b) shows an example of congestion degrees in a case where a vehicle travels across a general road and an expressway.

Based on the vehicle speeds between the 1st to 4th arrows, and the vehicle speeds between the 11th to 15th arrows, CD II (heavy congestion) is extracted. Based on the vehicle speeds between the 5th and 10th arrows, CD V (no congestion) is extracted. While CD V (no congestion) needs to be within the linked-congestion determination distance if the arrows are to be linked in accordance with CD II, the road types differ at the boundary between the 8th and 9th arrows in FIG. 9(b). In this case, in accordance with the present embodiment, the linked-congestion determination distance is adjusted depending on a road type ratio.

For example, when the travel distance of the general road is A (m) and that of the expressway is B (m), the parameter table 16 indicates that the linked-congestion determination distance for the general road and the expressway associated with CD II is L2 and L4, respectively. Thus, the linked-congestion determination distance of a section straddling both (i.e., the section between the 5th and 10th arrows) is adjusted as follows:

$$\text{Linked-congestion determination distance} = L2 \times A/(A+B) + L4 \times B/(A+B)$$

By thus adjusting the linked-congestion determination distance depending on the ratio of the distance of one road type to the distance of the other, a congestion that may appear at the time of a change in the road type can be properly linked.

The thus linked congestion degrees may be stored in the RAM of the probe ECU 12 or a part of the map data storing unit 15 as vehicle information.

Thus, by linking intermittent congestions in the case of the slow-state congestion degree while removing the effect of a temporary speed decrease in the case of the fast-state congestion degree, unstable information due to sporadic travelling status can be eliminated and stable traffic information can be generated.

(Step 3)

In step S3, the congestion degree recognition determination unit 12c considers congestions as a single continuous congestion and discards short congestions from the linked congestion degree.

If an isolated congestion appears after the linking process in step S2, such isolated congestion presumably reflects more often a temporary decrease or increase in the vehicle speed than an actual congestion or a high-speed running status. Thus, when the distance in which a congestion degree continues is less than a predetermined distance, the congestion degree at the relevant location is discarded and replaced with CD V (no congestion).

The congestion degree recognition determination unit 12c, when the same congestion degrees continue, considers them as a single continuation of the congestion degree. When congestions of different congestion degrees continue, the congestion degree recognition determination unit 12c handles them as if they were a single continuation in the case of the slow-state congestion degree, even if there is a congestion with a slower vehicle speed among them. For example, when CD I (extreme congestion) appears between CD's IV (light congestion), this is regarded as a continuation of CD IV (light congestion).

Thus, in step 3,

In the case of the slow-state congestion degree, congestions of equal or higher congestion degrees are handled as a single continuation.

In the case of the fast-state congestion degree, congestions of the same congestion degree are handled as a single continuation.

If the resultant continuation of congestion (where the slow-state congestion degree includes the four levels of CD's IV (light congestion), III (intermediate congestion), II (heavy congestion), and I (extreme congestion)) is short, this congestion is discarded.

In other words, in step 3,

If the continuous distance of a particular congestion degree is less than a predetermined distance, the congestion degree of the relevant location is discarded and replaced with CD V (no congestion).

The fast-state congestion degree refers to the single level of CD VI (absolutely no congestion). In step 3, If CD VI (absolutely no congestion) is less than a predetermined distance, CD VI is discarded and replaced by CD V (no congestion).

The "predetermined distance" in step S3 is registered in the parameter table 16 shown in FIG. 5 in advance as a congestion degree recognition determination value for each road type. For example, in the case of the general road associated with CD IV (light congestion), when the congestion degree recognition determination value is less than L3 (m), CD IV is discarded and replaced by CD V (no congestion).

FIG. 8(b) shows an example of the relationship between travel distance and vehicle speed in a case where the slow-state congestion degree is detected. When vehicle speeds from 0 to 10 km/h are defined as the heavily congested area, and vehicle speeds from 10 to 20 km/h are defined as the lightly congested area, a section b1 includes the heavily congested areas adjacent the two sections b2 of the lightly congested areas, and an area with CD V (no congestion) between the heavily congested areas.

In this case, the heavily congested areas are short (less than the congestion degree recognition determination value) and are therefore invalid. However, the lightly congested areas, as a continuation, are equal to or greater than the congestion degree recognition determination value and are therefore invalid.

FIG. 8(c) shows another example of the relationship between travel distance and vehicle speed in a case where the slow-state congestion degree is detected in a part of CD V (no congestion). In FIG. 8(c), the speed drop is only present at the position of distance C. Because this vehicle speed decrease is present over such a short distance alone and is less than the congestion degree recognition determination value, none of CD's IV, III, II, and I is recognized. Therefore, the speed decrease is discarded. By such processing, temporary stops made at the signals can be eliminated.

Figure 10:
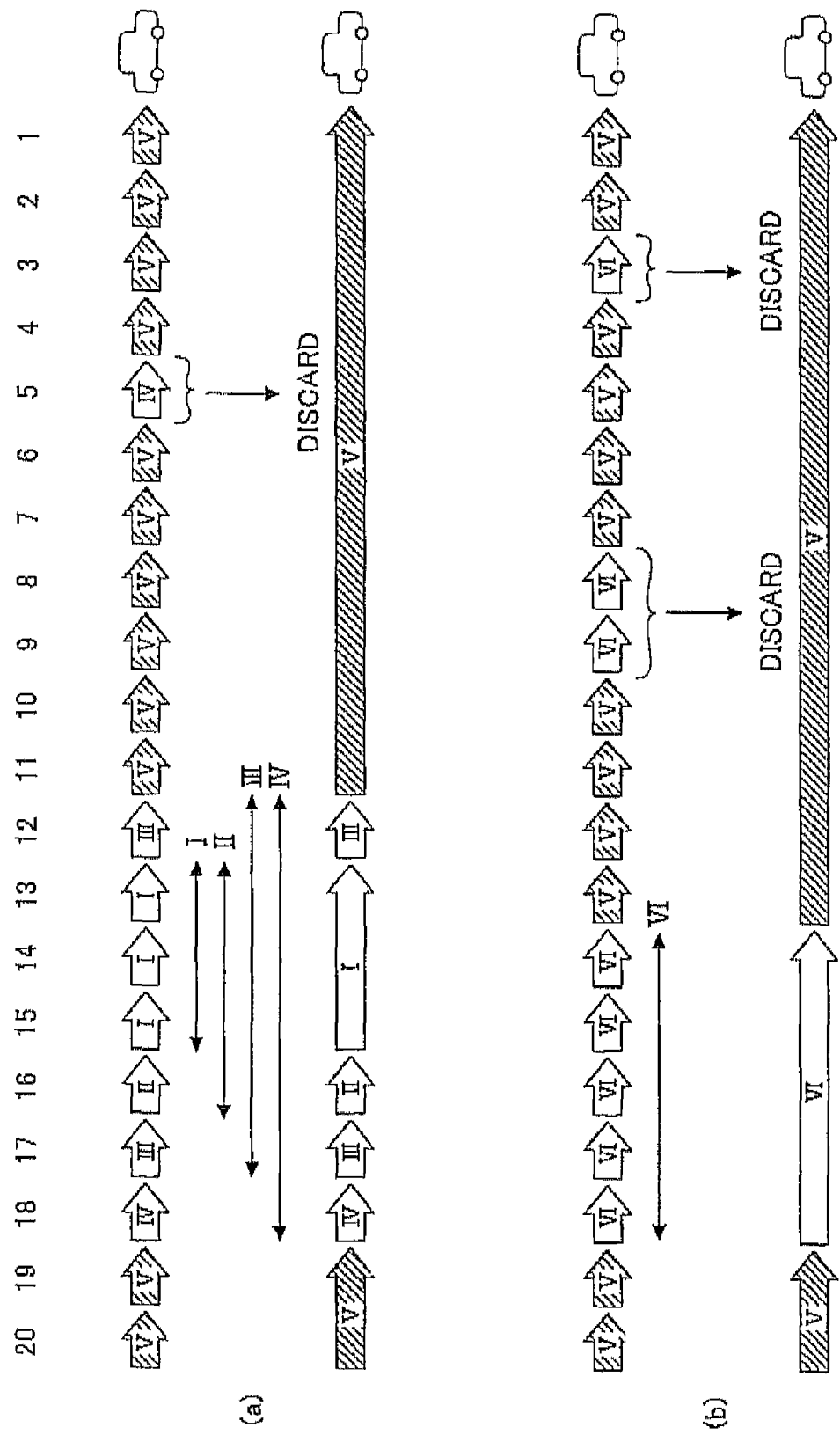
FIG. 10 illustrates how a short congestion degree is discarded and some congestion degrees are handled as being continuous based on a congestion degree recognition determination value.

FIGS. 10(a) and (b) illustrate how the congestion degree recognition determination unit 12c discards a short duration of a congestion degree and considers a series of arrows as a continuation of a certain congestion degree. FIG. 10(a) concerns the slow-state congestion degree, while FIG. 10(b) concerns the fast-state congestion degree. The congestion degrees illustrated in FIGS. 10(a) and (b) are different from those of FIG. 6 or 7. In accordance with the present embodiment, the congestion degree recognition determination value L3 is set such that a congestion degree that lasts for less than three arrows is discarded.

In the example shown in FIG. 10(a), CD IV (light congestion) is detected in the 5th arrow. However, the continuation distance of the congestion degree is less than the congestion degree recognition determination value. Thus, the 5th vehicle arrow is discarded, and the 1st to 11th arrows are considered to constitute a continuation of CD V (no congestion).

The 13th to 15th arrows indicate CD I (extreme congestion), and therefore they are considered to be a continuation of CD I. The 16th arrow indicates CD II (heavy congestion), and the adjacent 13th to 15th arrows indicate a congestion degree of a lower vehicle speed. Thus, the 13th to 16th arrows are considered to be a continuation of CD II (heavy congestion).

The 17th arrow indicates CD III (intermediate congestion), and the adjacent 12th to 16th arrows indicate the same congestion degree or lower vehicle speeds. Thus, the 12th to 17th arrows are handled as a continuation of CD III (intermediate congestion). The 18th arrow indicates CD IV (light congestion), and the adjacent 12th to 17th arrows indicate congestion degrees of the lower vehicle speeds. Thus, the 12th to 18th arrows are handled as a continuation of CD IV (light congestion).

As shown in FIG. 10(a), in the case of the 12th to 18th congestion degrees, a congestion degree considered to be continuous is compared with each congestion degree recognition determination value, and the congestion degrees that are equal to or greater than the congestion degree recognition determination value are finally considered to be continuous. If plural congestion degrees are extracted, heavier congestion degrees are preferentially continued. In the example of FIG. 10(a), the 13th to 15th arrows are considered to constitute a continuation of CD I (extreme congestion).

By thus discarding congestion degrees with a short continuation distance, the influence of temporary vehicle speed decreases, such as when waiting for the traffic signal, can be removed.

In the example of FIG. 10(b), CD VI (absolutely no congestion) is detected in the 3rd arrow. However, because its continuation distance is less than the congestion degree recognition determination value, the 3rd arrow is discarded. Similarly, the 8th and 9th congestion degrees are also discarded.

The 14th to 18th arrows indicate CD VI (absolutely no congestion). Because their continuation distance is equal to or greater than the congestion degree recognition determination value, the 14th to 18th arrows are not discarded and instead regarded as a continuation.

By thus discarding the congestion degrees less than the congestion degree recognition determination value, generation of traffic information that indicates that high-speed travel is only possible in a short section can be prevented.

As in step S2, in accordance with the present embodiment, congestion degrees are not regarded as a continuation at the time of a right or left turn. This is to avoid the false determination of a continuous congestion due to the vehicle speeds at the time of deceleration during a right or left turn, for example.

Because the congestion degree recognition determination value is registered on a road type basis, arrangements must be made concerning which congestion degree recognition determination value should be applied when a vehicle travels across roads of different road types. In accordance with the present embodiment, as in step S2, the congestion degree recognition determination value is adjusted depending on the road type ratio.

For example, with reference to the example shown in FIG. 9(b), a case is considered where the travel distance on a general road is A (m) and the travel distance on an expressway is B (m). According to the parameter table 16, the congestion degree recognition determination values in the case of the general road and the expressway associated with CD II (heavy congestion) are L3 and L5, respectively. Thus, the congestion degree recognition determination value for the straddling section (between the 5th and 10th arrows) is adjusted as follows:

Congestion degree recognition determination
value=L3×A/(A+B)+L5×B/(A+B)

By thus adjusting the congestion degree recognition determination value depending on the road type ratio when the vehicle is travelling across roads of different road types, a congestion that may appear at the time of transition from one road type to another can be properly handled as being continuous.

The congestion degrees that are discarded or considered to be continuous may be stored in the RAM of the probe ECU 12 or in a part of the map data storing unit 15 as vehicle information.

By thus removing the influence of temporary speed changes and thus regarding them as being continuous, the influences of the stops made at the signals or other instantaneous speed changes can be removed, thereby enabling the generation of highly accurate traffic information.

(Step S4)

In step S4, the link allocating unit 12d allocates the congestion degrees after the congestion degree recognition determination to the links. By so doing, a congestion degree can be detected on a link by link basis. The congestion degree of a link may be the same for the single entire link, or a single link may contain several congestion degrees. Thus, the link allocating unit 12d generates two types of congestion degrees: one is a congestion degree (hereafter referred to as a "representative congestion degree") for the link as a whole; the other is a partial congestion degree that indicates an individual congestion degree within one link.

When the link length is short, the need to generate the partial congestion degree is low; therefore, a partial congestion degree is generated in cases where the link length is equal to or greater than a predetermined distance. When the congestion degree in the link is uniform, no partial congestion degree is generated.

The "predetermined distance" in step S4 is registered in the parameter table 16 of FIG. 5 in advance as a partial congestion link length for each road type. For example, in the case of a general road, the partial congestion degree is generated when the partial congestion ink length=L5 (m) or greater.

FIGS. 11(a) and (b) illustrate how the link allocating unit 12d generates the representative congestion degree and the partial congestion degree. FIG. 11(a) concerns a case where each link length is greater than the partial congestion link length. FIG. 11(b) concerns a case where each link length is smaller than the partial congestion link length. While both FIGS. 11(a) and (b) concern the slow-state congestion degree, the fast-state congestion degree can be processed in the same manner.

The congestion degrees at the top of FIG. 11(a) correspond to the congestion degrees after the congestion degree recognition determination in step S3, where the congestion degrees axe divided by links A to E. Because link A includes CD's I (extreme congestion) and V (no congestion), the link allocating unit 12d generates a representative congestion degree for link A from the two congestion degree. For the calculation of the representative congestion degree, a variety of statistical processes involving average values, median values, and so on, may be employed. In accordance with the present embodiment, the representative congestion degree is generated based on a harmonic average.

Thus, the link allocating unit 12d calculates the representative congestion degree for link A as follows:

Representative congestion degree(link A)=Distance of link A/{(Distance of CDI/Speed of CDI)+(Distance of CDV/Speed of CDV)}

In the example of FIG. 11(a), the harmonic average of link A is CD I (extreme congestion).

Because link B has CD V (no congestion) throughout, CD V (no congestion) is given as its representative congestion degree. For Link C, based on a harmonic average of CD's V (no congestion) and III (intermediate congestion), CD IV (light congestion) is given as its representative congestion degree. For link D, the congestion degree is constant at CD I (extreme congestion); thus, CD I is given as its representative congestion degree. For link E, based on a harmonic average of CD's I (extreme congestion), II (heavy congestion), III (intermediate congestion), IV (light congestion), and V (no congestion), CD II (heavy congestion) is given as its representative congestion degree.

The link allocating unit 12d, in principle, generates the partial congestion degrees using the congestion degrees after the congestion degree recognition determination. Upon detection of successive congested states (of either CD I, II, III, or IV), they are considered to constitute a single congestion section, and the partial congestion degree for that section is generated based on a harmonic average.

For link A, CD's I (extreme congestion) and V (no congestion) constitute its partial congestion degrees. For link B, there is no partial congestion degree. For link C, CD's V (no congestion) and III (intermediate congestion) constitute its partial congestion degrees. For link D, there is no partial congestion degree. For link E, because CD's I, II, III, and IV are detected successively, these congestion degrees are considered to constitute a single congestion section, while CD V (no congestion) constitutes a partial congestion degree. The partial congestion degree of the integrated single congestion section is CD II (heavy congestion) based on a harmonic average.

Hereafter, a description is given of a case where none of the link lengths exceeds the partial congestion link length. Description of the generation of the representative congestion degree is omitted because the process is the same when the link length is less than the partial congestion link length.

None of the link lengths shown in FIG. 11(b) exceeds the partial congestion link length. Thus, the link allocating unit 12d generates no partial congestion degrees. Accordingly, as shown in FIG. 11(b), the overall congestion degree and the partial congestion degree are the same.

The representative congestion degrees and the partial congestion degrees allocated to the links may be stored in the RAM of the probe ECU 12 or in a part of the map data storing unit 15 as vehicle information.

Thus, by allocating a congestion degree to each link, it becomes possible to handle the congestion degrees in association with the links (roads). Further, even after the allocation, the partial congestions within the link can be handled, so that detailed traffic information can be obtained.

(Step S5)

In step S5, the congestion location grouping unit 12e and the link end correcting unit 12f generate more accurate traffic information using vehicle information about individual vehicles. With the vehicle information acquired by the processes up to step S4, the congestion location differs depending or the stop position of an individual vehicle. Thus, in step S5, vehicle information about plural vehicles is used to correct errors caused by the position of each vehicle. Thus, each vehicle 2 transmits vehicle information to the vehicle information server 5 so that the vehicle information server 5 can generate traffic information.

The link end may be corrected by the probe ECU 12 of each vehicle. In this case, the probe ECU 12 may be configured to transmit and receive inter-vehicle information using any of the known inter-vehicle communications or road-to-vehicle communications technologies.

In step S4, the representative congestion degree is obtained on a link by link basis. When plural vehicles travel along the same link, each of the vehicles generates the representative congestion degree. FIG. 12(a) shows the representative congestion degrees for the same link generated by plural vehicles. For a given link, vehicle A detects CD III (intermediate congestion); vehicle B detects CD I (extreme congestion); vehicle C detects CD II (heavy congestion); vehicle D detects CD V (no congestion); and vehicle E detects CD II (heavy congestion). The congestion location grouping unit 12e generates the congestion degree for the link by calculating a harmonic average as follows:

Statistical value=Number of samples/{(1/CD$IV$)+(1/CD$I$)+(1/CD$II$)+(1/CD$V$)+(1/CD$II$)}

In the example of FIG. 12(a), the statistical value is CD II (heavy congestion).

Thereafter, the congestion location grouping unit 12e generates detailed congestion degrees within the link from the vehicle information about the plural vehicles. The congestion location grouping unit 12e groups partially congested locations in the link based on a head position and a tail position of each partial congestion of each vehicle.

FIG. 12(b) shows the partial congestion degrees generated from the vehicle information about the plural vehicles and how they are grouped. The congestion location grouping unit 12e superimposes the partial congestion degrees of the individual vehicles, and divides the overlapping congestion locations into the same congestion group.

In the example of FIG. 12(b), vehicle A has two partial congestion degree sections A1 and A2 of CD I (extreme congestion). Vehicle B has the partial congestion degree section B1 of CD I (extreme congestion). Vehicle C has the partial congestion degree section C1 of CD II (heavy congestion). Vehicle D has the two partial congestion degree sections D1 and D2 of CD I (extreme congestion).

When the congestion locations are compared among the vehicles, there are overlaps between A1 and B1, B1 and C1, and C1 and D1. Such overlapping portions between a front end (A1) and a rear end (C1) are grouped into a single partial congestion group by the congestion location grouping unit 12e.

Similarly, because the congestion locations of A2 and D2 are overlapping, the congestion location grouping unit 12e groups the overlapping congestion locations between a front end (A2) and a rear end (D2) into a single partial congestion group. In the example of FIG. 12(b), partial congestion groups 1 and 2 are obtained.

By thus grouping the partial congestion degrees of plural vehicles, a congestion location error due to the stopping position of the individual vehicles can be removed.

On the other hand, however, if a congestion location is detected only for one vehicle when the partial congestion degrees of plural vehicles are acquired, no grouping is performed. FIG. 12(c) shows an example in which, although the vehicles have congestion locations as in the example of FIG. 12(b), the congestion location C1 of vehicle C has no overlaps with the congestion location of any of the other vehicles. Thus, when a congestion location is detected only for a single vehicle in an isolated manner, the congestion location grouping unit 12e does not group the partial congestion degrees of the plural vehicles. In this way, the grouping of the entire link into a congestion location group due to the linking of the individual congestion locations can be prevented.

In a case where plural groups are generated in a single link, a group with a greater number of samples (i.e., the vehicles detected as congestion locations) is preferentially adopted. When the numbers of samples are the same, a group with a longer congestion location is preferentially adopted.

Hereafter, a description is given of the correction of the link end. Even if a partial congestion group is generated from the partial congestion degrees of plural vehicles, this does not mean that vehicle information has been acquired from all of the vehicles travelling along a particular link. Thus, the head and tail positions of a congestion cannot be accurately detected. Furthermore, the congestion positions usually shift.

Thus, for convenience's sake, the head position, the tail position, and the congestion degree of a congestion are determined as follows:

(a) Congestion head position: Position of partial congestion of plural vehicles that is nearest the link terminal end
(b) Congestion tail position: Arithmetic average of the congestion tail positions of the vehicles
(c) Congestion degree: Harmonic average of the partial congestion degrees of the vehicles FIG. 13(a) illustrates how the head position, the tail position, and the congestion degree of a partial congestion group are determined. The tail position of the congestion by vehicle A is a (m) from the link terminal end. The tail position of the congestion by vehicle B is b (m) from the link terminal end. The tail position of the congestion by vehicle C is c (m) from the link terminal end. And the tail position of the congestion by vehicle E is e (m) from the link terminal end. Thus, the congestion tail position can be determined from an arithmetic average of a, b, c, and e. The "link terminal end" refers to the front end of the arrow.

Vehicle A has CD I (extreme congestion); vehicle B has CD I (extreme congestion; vehicle C has CD II (heavy congestion); vehicle D has CD V (no congestion); and vehicle E has CD II (heavy congestion). Because the congestion location of the group is determined by the aforementioned (a) and (b), the congestion degree is calculated from a harmonic average as follows:

Congestion degree=Number of samples/{(1/CD$I$)+(1/CD$I$)+(1/CD$II$)+(1/CD$V$)+(1/CD$II$)}

In the example of FIG. 13(a), the result of the harmonic-averaging is CD I (extreme congestion).

Thereafter, the link end correcting unit 12f corrects the congestion degree at the link end of the partial congestion degree. As regards the representative congestion degree, there is no need for correction of the link end because the congestion degree is uniform throughout the link.

In accordance with the present embodiment, the link end is corrected after the congestion degrees of plural vehicles are grouped. Alternatively, the link end may be corrected directly in the partial congestion degree of each vehicle.

With reference to FIG. 13(b), the process of correcting the link end of a partial congestion degree is described. The link end correcting unit 12f substitutes an adjacent congestion degree for a congestion degree located within a predetermined distance of the link terminal end.

The "predetermined distance" in step S5 is registered in the parameter table 16 of FIG. 5 in advance as a link end correction range. The correction of the link end is required in principle for a link that includes a traffic signal. Thus, the link end correction range is registered with regard to the general road alone.

With reference to the left half of FIG. 13(b), CD I (extreme congestion) is detected within the link end correction range from the link terminal end. Thus, the congestion degree up to the link terminal end is substituted by CD I. In the case of the right half of FIG. 13(b), no congestion degree is detected within the link end correction range from the link terminal end. Thus, no substitution of congestion degree is performed.

Thus, in the little section with CD V (no congestion) at the link terminal end, the vehicle speed may be increased because the vehicle, having been waiting for the signal, is not the leading vehicle. In reality, however, the congestion more often than not continues up to the link terminal end. Thus, by correcting the link terminal end as shown in FIG. 13(b), the head position of the congestion location can be correctly detected.

Similarly, the link end correcting unit 12f, if the head position of the partial congestion is within the predetermined distance of the link beginning end, discards the relevant partial congestion degree.

With reference to the left half of FIG. 13(c), CD I (extreme congestion) is detected within the link end correction range from the link beginning end alone. Thus, CD I is discarded. With reference to the right half of FIG. 13(c), a congestion degree is detected beyond the link end correction range from the link beginning end. Thus, the congestion degree is not discarded.

Thus, in a short interval at the link beginning end, a congestion may often be caused by the low vehicle speed due to the insufficient acceleration of the vehicle that has been waiting for the signal in the preceding link. Thus, by correcting the link beginning end as shown in the left half of FIG. 13(c), a false congestion at the link beginning end can be removed.

Further, by subjecting the congestion degrees of plural vehicles to statistical processing, the possible congestion position and congestion degree of an individual vehicle can be smoothed, so that accurate traffic information for the relevant link can be generated.

As described above, in accordance with the traffic information generating method of the present embodiment, the influences of the stops made for the traffic signals or the instantaneous vehicle speed changes can be removed. Thus, accurate traffic information can be generated by taking advantage of the vehicle speed information collected by the probe car.

Although this invention has been described in detail with reference to certain embodiments, variations and modifications exist within the scope and spirit of the invention as described and defined in the following claims.

The present application is based on the Japanese Priority Application No. 2006-189561 filed Jul. 10, 2006, the entire contents of which are hereby incorporated by reference.

The invention claimed is:

1. A traffic information generating method for generating traffic information about a road on which a vehicle travels, the method comprising:
   a vehicle speed detecting step of detecting a vehicle speed of the vehicle at predetermined distance or time intervals using a vehicle speed sensor; and
   a congestion degree detecting step of a congestion degree detection unit detecting a congestion degree associated with the vehicle speed by referring to a prescribed speed and a prescribed distance that are predetermined in association with the congestion degree, and a link determination distance prescribed in accordance with a road type,
   wherein the congestion degree detecting step includes determining that the vehicle speed is lower than the prescribed speed between a first point at which the vehicle speed becomes equal to or greater than the prescribed speed to a second point that is within the link determination distance from the first point, when:
   a) the vehicle speed is lower than the prescribed speed at the second point,
   the congestion degree detecting step determining that the vehicle speed is equal to or greater than the prescribed speed between a first point at which the vehicle speed drops below the prescribed speed and a second point that is within the link determination distance from the first point when:
   b) the vehicle speed is equal to or greater than the prescribed speed at the second point, and
   wherein the congestion degree detecting step includes determining that the vehicle speed is not lower than the prescribed speed between the first point and the second point when the condition a) is satisfied, or that the vehicle speed is not equal to or greater than the prescribed speed between the first point and the second point when the condition b) is satisfied, in a case where the vehicle makes a right turn or a left turn between the first point and the second point.

2. The traffic information generating method according to claim 1, wherein the congestion degree detecting step includes detecting the congestion degree indicating a congestion when the vehicle speed is below the prescribed speed continuously for a distance equal to or greater than the prescribed distance,
   the congestion degree detecting step detecting the congestion degree indicating a high-speed road when the vehicle speed is equal to or greater than the prescribed speed continuously for a distance equal to or greater than the prescribed distance.

3. The traffic information generating method according to claim 1, wherein the congestion degree detecting step includes a continuing step of invalidating the congestion degree that is linked in accordance with the link determination distance when the linked congestion degree does not continue for a distance equal to or greater than the prescribed distance.

4. The traffic information generating method according to claim 1, wherein the prescribed distance and the link determination distance are prescribed in accordance with the road type,
   wherein the prescribed distance and the link determination distance are changed in accordance with a road type ratio at a point where the vehicle travels from one road type to another.

5. The traffic information generating method according to claim 1, further comprising an allocating step of an allocating unit extracting a link from a road map storing unit in which a road map of the road is stored, the allocating unit allocating the congestion degree linked in accordance with the link determination distance to the link.

6. The traffic information generating method according to claim 5, further comprising the steps of:
   the allocating unit generating a partial congestion degree, wherein a plurality of the congestion degrees are allocated to a link having a length equal to or greater than a particular partial congestion degree generating link length; and
   a link end correcting unit referring to a prescribed link end correction range and correcting the congestion degree up to the link terminal end or the link beginning end when the partial congestion degree is allocated more towards the link terminal end or the link beginning end than the link end correction range.

7. The traffic information generating method according to claim 1, wherein the congestion degree has plural levels associated with a plurality of the prescribed speeds.

8. The traffic information generating method according to claim 1, comprising generating the traffic information using an on-board device mounted on the vehicle.

9. The traffic information generating method according to claim 6, comprising:
   connecting the vehicle with a vehicle information server via a network;
   transmitting the vehicle information from the vehicle to the vehicle information server via the network; and
   generating the traffic information using the vehicle information server.

10. The traffic information generating method according to claim 9, comprising the steps performed by the link end correcting unit of:
    receiving the vehicle information from a plurality of vehicles:
    grouping the partial congestion degrees of the plural vehicles with regard to the same link; and
    calculating the congestion degree in terms of a statistical value of the partial congestion degrees in each group.

11. The traffic information generating method according to claim 10, wherein the partial congestion degree shared by a number of vehicles less than a predetermined number is not grouped.

12. The traffic information generating method according to claim 10, wherein, when there is a plurality of the groups, the group having a greater number of vehicles is preferentially adopted.

13. The traffic information generating method according to claim 12, wherein, when there are two or more groups that have the same number of vehicles, a longest group is preferentially adopted.

14. A traffic information generating apparatus for generating traffic information about a road on which a vehicle travels, the apparatus comprising:
    a congestion degree detection unit configured to detect a congestion degree in accordance with a vehicle speed that is detected by an on-board vehicle speed sensor at predetermined distance or time intervals, by referring to a prescribed speed and a prescribed distance that are predetermined in association with the congestion degree, and a link determination distance prescribed in accordance with a road type,
    wherein the congestion degree detection unit is configured to determine that the vehicle speed is lower than the prescribed speed between a first point at which the vehicle speed becomes equal to or greater than the prescribed speed to a second point that is within the link determination distance from the first point, when:
    a) the vehicle speed is lower than the prescribed speed at the second point,
    the congestion degree detection unit is configured to determine that the vehicle speed is equal to or greater than the prescribed speed between a first point at which the vehicle speed drops below the prescribed speed and a second point that is within the link determination distance from the first point when:
    b) the vehicle speed is equal to or greater than the prescribed speed at the second point, and
    wherein the congestion degree detection unit is configured to determine that the vehicle speed is not lower than the prescribed speed between the first point and the second point when the condition a) is satisfied, or that the vehicle speed is not equal to or greater than the prescribed speed between the first point and the second point when the condition b) is satisfied, in a case where the vehicle makes a right turn or a left turn between the first point and the second point.

15. A display unit configured to display the traffic information generated by the traffic information generating apparatus according to claim 14.

16. A navigation system comprising:
    a map data storing unit configured to store a road map of a road on which a vehicle travels;
    a positioning unit configured to determine a position of the vehicle using a radio wave emitted by an artificial satellite; and
    a display unit configured to display the traffic information generated by the traffic information generating apparatus according to claim 14, together with the road map.

17. An electronic control unit for generating traffic information about a road on which a vehicle travels, comprising:
    a congestion degree detection unit configured to detect a congestion degree in accordance with a vehicle speed detected by a vehicle speed sensor at predetermined distance or time intervals, by referring to a prescribed speed and a prescribed distance that are prescribed in association with the congestion degree, and a link determination distance prescribed in association with a road type,
    wherein the congestion degree detection unit is configured to determine that the vehicle speed is lower than the prescribed speed between a first point at which the vehicle speed becomes equal to or greater than the prescribed speed to a second point that is within the link determination distance from the first point, when:
    a) the vehicle speed is lower than the prescribed speed at the second point,
    the congestion degree detection unit is configured to determine that the vehicle speed is equal to or greater than the prescribed speed between a first point at which the vehicle speed drops below the prescribed speed and a second point that is within the link determination distance from the first point when:
    b) the vehicle speed is equal to or greater than the prescribed speed at the second point, and
    wherein the congestion degree detection unit is configured to determine that the vehicle speed is not lower than the prescribed speed between the first point and the second point when the condition a) is satisfied, or that the vehicle speed is not equal to or greater than the prescribed speed between the first point and the second point when the condition b) is satisfied, in a case where the vehicle makes a right turn or a left turn between the first point and the second point.

18. The traffic information generating method according to claim 1, wherein the link determination distance is set in association with the congestion degree in the road type.

* * * * *